US010926169B2

(12) United States Patent
Itay et al.

(10) Patent No.: US 10,926,169 B2
(45) Date of Patent: Feb. 23, 2021

(54) CROSS-DEVICE ACCESSORY INPUT AND OUTPUT FOR ENHANCED GAMING EXPERIENCE

(71) Applicant: Microsoft Technology Licensing, LLC, Redmond, WA (US)

(72) Inventors: Meir Ben Itay, Sammamish, WA (US); Shrey Nitin Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 16/375,689

(22) Filed: Apr. 4, 2019

(65) Prior Publication Data

US 2020/0316463 A1 Oct. 8, 2020

(51) Int. Cl.
*A63F 13/323* (2014.01)
*A63F 13/245* (2014.01)
*A63F 13/355* (2014.01)
*A63F 13/86* (2014.01)

(52) U.S. Cl.
CPC .......... *A63F 13/323* (2014.09); *A63F 13/245* (2014.09); *A63F 13/355* (2014.09); *A63F 13/86* (2014.09)

(58) Field of Classification Search
CPC ...... A63F 13/323; A63F 13/355; A63F 13/86; A63F 13/245; A63F 13/85; A63F 13/26; A63F 13/31; A63F 13/92; A63F 13/20
See application file for complete search history.

(56) References Cited

U.S. PATENT DOCUMENTS

| 2009/0122006 | A1* | 5/2009 | Nielsen | G06F 3/016 345/156 |
| 2014/0221087 | A1* | 8/2014 | Huang | A63F 13/34 463/31 |
| 2014/0294307 | A1* | 10/2014 | Huang | H04N 7/0122 382/191 |
| 2017/0034234 | A1* | 2/2017 | Zimring | H04L 65/602 |
| 2017/0083344 | A1* | 3/2017 | Zeung | G06F 3/023 |

OTHER PUBLICATIONS

"Airplay, Apple TV and Remote Events—is it Only for Streaming Audio/Video?", Retrieved From: https://web.archive.org/web/20130301144105/https://stackoverflow.com/questions/8460399/airplay-apple-tv-and-remote-events-is-it-only-for-streaming-audio-video, Mar. 1, 2013, 2 Pages.

(Continued)

*Primary Examiner* — Jasson H Yoo

(57) ABSTRACT

In non-limiting examples of the present disclosure, systems, methods and devices for providing collaborative use of computing resources in videogame execution are provided. A list comprising an identity of a plurality of mobile games executable on a mobile computing device (e.g., smart phone, tablet) and controllable, on the mobile computing device, by one or more input devices for a primary computing device (e.g., personal computer, game console) may be surfaced. A selection of one of the plurality of mobile games may be received. The mobile computing device and the primary computing device may be paired. A video data stream of the selected game being executed on the mobile computing device may be received. The video data stream may be displayed on a display device associated with the primary computing device.

19 Claims, 9 Drawing Sheets

(56) References Cited

OTHER PUBLICATIONS

"Comparison of Remote Desktop Software Contents", Retrieved from: https://en.wikipedia.org/w/index.php?title=Comparison_of_remote_desktop_software&oldid=890618656, Retrieved on: Jun. 29, 2020, 18 Pages.
"International Search Report & Written Opinion issued in PCT Application No. PCT/US20/024352", dated Jul. 10, 2020, 13 Pages.
Piltch, Avram, "How to Control an Android Device From Your PC", Retrieved From: https://web.archive.org/web/20150906224324/https://www.laptopmag.com/articles/control-android-from-pc, Aug. 10, 2013, 11 Pages.

* cited by examiner

CROSS-DEVICE ACCESSORY INPUT AND OUTPUT FOR ENHANCED GAMING EXPERIENCE

BACKGROUND

As mobile computing devices have become increasingly sophisticated in their hardware, software and processing capabilities, so to have the games that developers create for them. Today, mobile games are generally only limited by constraints inherent to the mobile devices themselves such as the limited size of the display and the limited input mechanisms. Alternatively, gamers may have substantial resources available to them on, or associated with, their primary gaming devices (e.g., personal computers, videogame consoles) that are typically only used for playing platform-specific games. Those resources may include large displays/monitors, game controllers, joysticks, and sophisticated sound systems, among others.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing collaborative use of computing resources in videogame execution. When a user's mobile computing device connects to the user's primary gaming device (e.g., personal computer, videogame console), the primary gaming device may determine whether there are mobile games installed on the mobile computing device that are compatible with one or more input or output accessories associated with the user's primary gaming device. The user may utilize a gaming application or widget on the primary gaming device to select from available mobile games to initiate the utilization of primary gaming device accessories for input and/or output during execution of the selected game by the mobile computing device. That is, the mobile computing device may execute the processing of the selected mobile game, but the audio, video and/or haptic output may be surfaced by accessories of the primary gaming device, and/or the controls for the game may be received via the input accessories for the primary gaming device (e.g., controllers, joysticks, keyboards, etc.).

BRIEF DESCRIPTION OF THE DRAWINGS

Non-limiting and non-exhaustive examples are described with reference to the following figures.

DETAILED DESCRIPTION

Figure 1:
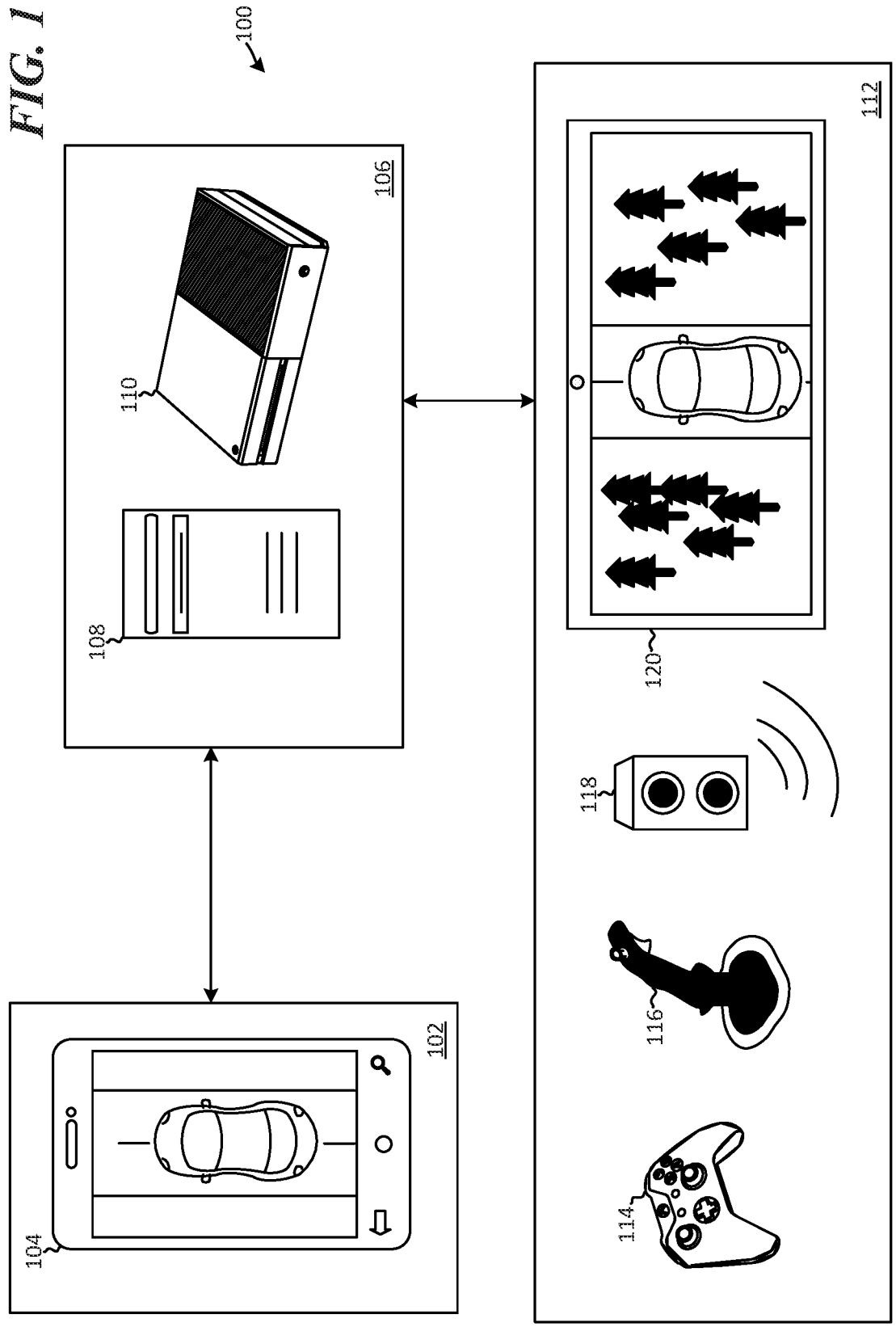
FIG. 1 is a schematic diagram illustrating an example distributed computing environment for providing collaborative use of computing resources in videogame execution.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for providing collaborative use of computing resources in videogame execution. As described herein, mobile computing devices (e.g., smart phones, tablets), primary gaming computing devices (e.g., personal computers, laptops, videogame consoles), and primary gaming computing devices' input and output accessories (e.g., displays/monitors, speakers, controllers, joysticks, keyboards, mice) may be used collaboratively in playing videogames that are specific to mobile platforms. When a user's mobile computing device and primary gaming computing device are within connectable proximity, those devices may be connected to one another via wired or wireless communication. The primary gaming computing device may surface (via application, widget, etc.) a list of mobile games installed on the user's connected mobile device that can utilize input and/or output accessories associated with the user's primary gaming computing device. In some examples, the primary gaming computing device may surface the list on a display of the primary gaming computing device and/or on the mobile computing device.

In some examples, the user may select one of the mobile games from the list, and initiate execution of the selected game by the mobile device, while being able to input controls to the game via input accessories associated with the primary gaming computing device, and have output such as video display, audio output, and haptic output surfaced via output accessories associated with the primary gaming computing device. In some examples, an output translation engine may be utilized for converting output signals (e.g., video signals, audio signals, haptic signals) from a mobile output type to a primary gaming computing device accessory output type. Similarly, an input translation engine may be utilized for converting input signals generated by accessories of the primary gaming computing device to mobile device signals interpretable by the corresponding mobile gaming engine. Operations associated with the output translation engine may be performed by one or more of: the mobile computing device, the primary gaming computing device, and/or the accessory device. Operations associated with the input translation engine may similarly be performed by one or more of: the accessory device, the primary gaming computing device, and/or the mobile computing device.

The systems, methods, and devices described herein provide technical advantages for videogame execution. In some examples, processing resources may be efficiently distributed across device types via the collaborative mechanisms described herein by utilizing the input and output accessory devices of gaming devices that are specifically tailored for playing videogames. For example, rather than taking up limited processing resources of a mobile computing device to display gaming activities on the mobile device's limited display space, the mobile device can delegate the processing associated with that video/graphics displaying to the primary gaming computing device. Similarly, rather than utilizing the limited audio resources of a mobile device, the processing of audio signals and their corresponding output can be delegated to speaker output devices associated with the primary gaming computing device. In some examples, more sophisticated commands may be executed by a mobile videogame via the mechanisms described herein than would otherwise be possible. For example, controllers, joysticks and other input accessory devices that have been designed specifically for primary gaming computing devices may provide input controls to a mobile game executed on a mobile device via the primary gaming computing device. Thus, rather than being limited to the small-form factor input mechanisms of a mobile computing device, a translation engine associated with the primary gaming computing device and its associated controller accessories can provide enhanced controls for mobile videogames being executed by the mobile computing device. Memory costs are also saved by eliminating the need to download two different versions of a same game (e.g., one that can be played on a mobile device and one that can be played on a primary gaming computing device).

FIG. 1 is a schematic diagram illustrating an example distributed computing environment 100 for providing collaborative use of computing resources in videogame execution. Computing environment 100 includes mobile device sub-environment 102, primary computing device sub-environment 106, and device accessories sub-environment 112. Any and all of the computing devices and accessories shown in FIG. 1 may communicate with one another over a wired or wireless connection (e.g., Internet, Wi-Fi, Bluetooth, etc.). Mobile device sub-environment 102 includes mobile computing device 104 (e.g., a smart phone, a tablet). Primary computing device sub-environment 106 includes personal computer 108 and videogame console 110. Device accessories sub-environment 112 includes console controller 114, joystick 116, speakers 118 and external monitor 120.

In this example, a user has a car racing videogame installed on, or otherwise accessed by, mobile computing device 104. Computing device 104 and its associated user are in physical proximity to one or both of personal computer 108 and/or videogame console 110, as well as one or more of the accessories shown in device accessories sub-environment 112. Thus, the user may prefer to play the car racing videogame using one or more of the accessories shown in device accessories sub-environment 112 and/or utilize the processing power provided by personal computer 108 and/or videogame console 110 in playing the car racing videogame.

In some examples, when mobile computing device 104 is within communicative range of personal computer 108 or videogame console 110 ("primary devices", "primary computing devices", or "primary gaming computing devices"), and a user opens a mobile video game such as the car racing videogame, the user may be prompted from mobile computing device 104 to select whether the user would like to continue playing the videogame from one of the primary devices. In other examples, when mobile computing device 104 is within communicative range of one of the primary devices, the user may access a game selection menu (e.g., via a game application, via a widget, etc.) on one of the primary devices that allows the user to begin playing a mobile videogame installed or otherwise accessed via mobile computing device 104 on one of the primary devices. For example, the user may open a mobile game selection menu on one of the primary computing devices, the game selection menu may be displayed on external monitor 120, which may be paired to one or both of the primary computing devices, and the game selection menu may display a list of mobile videogames installed on computing device 104. The user may select a game from the list of mobile videogames and when a selection is made that game may be initiated on mobile computing device 104. However, in addition or alternatively to displaying the initiated videogame on mobile computing device 104, the video data stream from the mobile videogame may be transferred from mobile computing device 104 to the primary computing device, which may then display the video data stream for the game on its corresponding display (e.g., external monitor 120). In examples where the primary computing device does not have an external monitor associated with it, the mobile videogame may continue to be displayed on mobile computing device 104.

In examples where a primary computing device has one or more input or output accessories associated with it, those input or output accessories may be utilized to interact or provide functionality associated with the mobile videogame. For example, if a user has chosen to utilize one of the primary devices (i.e., personal computer 108, videogame console 110) to interact with a mobile videogame executed on mobile computing device 104, accessories of the selected primary device may be utilized to control the mobile videogame and/or provide output associated with the mobile videogame (e.g., video output, audio output, haptic output). Thus, if console controller 114 is connected to videogame console 110, console controller may be utilized to control the mobile videogame being executed on mobile computing device 104 whether the mobile videogame is being displayed on mobile computing device 104 and/or external monitor 120. In another example, if joystick 116 is connected to personal computer 108, joystick 116 may be utilized to control the mobile videogame being executed on mobile computing device 104 whether the mobile videogame is being displayed on mobile computing device 104 and/or external monitor 120.

In some examples, an input translation list comprising a set of instructions for translating input signals from one of the accessory input devices (e.g., console controller 114, joystick 116) to corresponding mobile game inputs/controls may be stored on one or more of: the accessory input devices themselves, the primary computing devices, and/or the mobile computing device. Thus, in examples, if user input is received via one of the accessory devices, that input may be sent to the primary computing device that the accessory device is connected to and the input may be sent from the primary computing device to the mobile computing device where the input is utilized to control the mobile videogame. The translation of the input may occur at the input accessory, the primary computing device, or the mobile computing device.

In examples where a primary computing device (e.g., personal computer 108, videogame console 110) is associated with one or more output devices (e.g., speakers 118, external monitor 120), the videogame being executed on an associated mobile computing device (e.g., mobile computing device 104) may utilize one or more of those output devices for surfacing game content (e.g., video, audio, haptics). Thus, if external monitor 120 is connected to personal computer 108 and/or videogame console 110, the videogame being executed on mobile computing device 104 may be displayed by external monitor 120. In another example, if speakers 118 are connected to personal computer 108 and/or videogame console 110, the videogame executed on mobile computing device 104 may have its corresponding audio produced by speakers 118.

In some examples, an output translation list comprising a set of instructions for translating output signals (video signals, audio signals, haptic signals) from the mobile computing devices to corresponding output devices may be stored on one or more of: the mobile computing devices, the primary computing devices, and/or the output computing devices. Thus, in examples, if a mobile videogame audio or video output signal is produced by a mobile videogame being executed on a mobile computing device, that signal may be sent to the primary computing device that the user has chosen to utilize in playing the mobile videogame, and the primary computing device may transfer that signal to one or more corresponding output accessories. The translation of the output signal from the mobile computing device to the accessory device may occur at any of the devices associated with the signal transfer. In some examples, the translation of the signal may provide augmentation of the original content. Thus, in the illustrated example, external monitor 120 displays additional video content that was not present in the mobile computing device video signal of the car racing videogame. That is, external monitor 120 provides a wider field of view, and the mobile videogame video signal is translated to provide additional video content to fill the field of view of external monitor 120. In other examples, the video content from the mobile computing device may be mirrored on the external monitor rather than being augmented in its translation.

Figure 2:
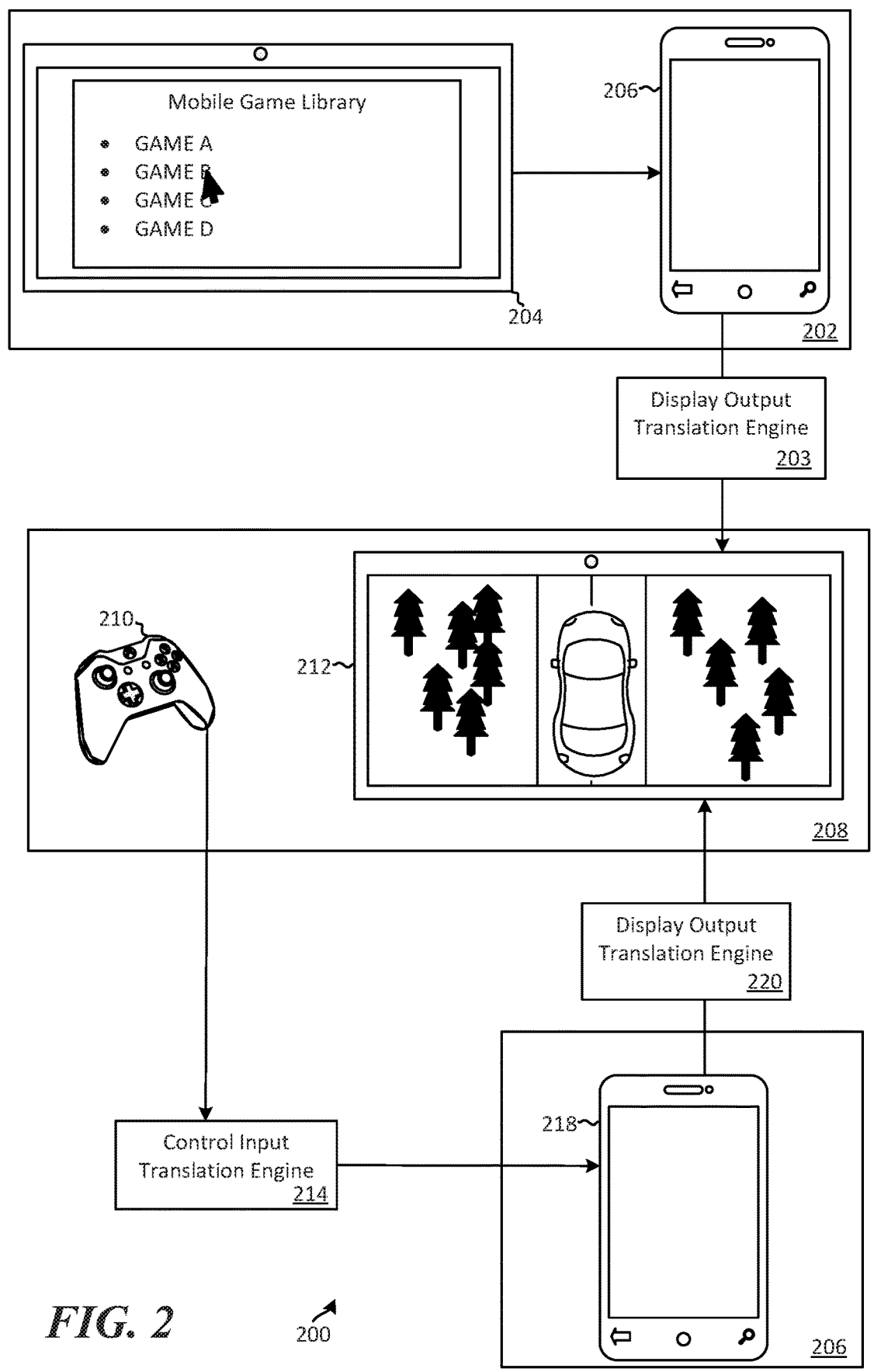
FIG. 2 is another schematic diagram illustrating an example distributed computing environment for initiating the utilization of personal computer and/or game console computing resources in the execution of a mobile videogame.

FIG. 2 is another schematic diagram illustrating an example distributed computing environment 200 for initiating the utilization of personal computer and/or game console computing resources in the execution of a mobile videogame. Distributed computing environment 200 includes mobile game selection sub-environment 202, input/output accessory sub-environment 208, and mobile game execution sub-environment 206. Mobile game selection sub-environment 202 includes personal computer 204, which is incorporated in a display and is the same computing device as personal computer 212; and mobile computing device 206, which is the same computing device as mobile computing device 218. Input/output accessory sub-environment 208 includes controller 210 and personal computer 212. Mobile game execution sub-environment 206 includes mobile computing device 218, which is the same computing device as mobile computing device 206 in mobile game selection sub-environment 202.

In this example, mobile computing device 202 and personal computer 204 have formed a connection (e.g., Bluetooth connection, Wi-Fi connection). Once the connection has been established, a user has accessed a game application and/or widget on personal computer 204, which is shown surfacing a mobile game library on the display of personal computer 204. In examples, personal computer 204 may determine via the connection with mobile computer device 202, whether one or more of the mobile videogames installed on mobile computing device 206 are compatible with one or more input and/or output accessory devices associated with personal computer 204 (including the integrated display). In the illustrated example, personal computer 204 has determined that there are four mobile videogames (i.e., GAME A, GAME B, GAME C, GAME D) installed on mobile computing device 206 that are compatible with one or more input and/or output accessory devices associated with personal computer 204. The user may then select one of the games from the mobile game library list displayed by personal computer 204, and that game may start to run on mobile computing device 206 while being displayed and interactable with via personal computer 204. In this example, the user selects "GAME B" from the mobile game library list displayed by personal computer 204, which corresponds to a mobile car racing game installed on mobile computing device 206, and execution of the mobile car game is then initiated by mobile computing device 202.

In this example, display output translation engine 203 receives video signals from the mobile car game executed on mobile computing device 202 and translates them for producing on the display of personal computer 212. Output translation engine 203 may perform one or more operations to translate audio, video and/or haptic signals for a videogame executed on mobile computing device 206 for producing on one or more accessory devices associated with a primary computing device. According to examples, output translation engine 203 may be associated with a translation list comprising an identity of a plurality of mobile videogames and an identity of a plurality of accessory devices that may be utilized to control and/or provide output for the corresponding mobile videogames. In some examples, operations associated with translation engine 203 may be performed on one or both of mobile computing device 206 and/or personal computer 212. In this example, display output translation engine 203 augments the video signals from the car racing game to expand the field of view on the entire display space of personal computer 212. In other examples, the display output translation engine 203 may provide a one-to-one mapping of the mobile videogame to the external display. In still additional examples, a translation engine may not be utilized in providing the output from the mobile computing device to the output accessories.

As illustrated in this example, controller 210 is associated with personal computer 212 and controller 210 is compatible with the car racing videogame (i.e., GAME B). Thus, when the user utilizes one of the buttons and/or controls on controller 210, that input is received by control input translation engine 214, which translates the input for interacting with the car racing videogame being executed on mobile computing device 218. Control input translation engine 214 may perform one or more operations to translate button and/or control input signals from controller 210 for controlling or otherwise interacting with a videogame being executed on mobile computing device 206. According to examples, control input translation engine 214 may be associated with a translation list comprising an identity of a plurality of mobile videogames and an identity of a plurality of accessory devices that may be utilized to control and/or provide output for the corresponding mobile videogames. In some examples, operations associated with control input translation engine 214 may be performed on one or more of controller 210, mobile computing device 218 and/or personal computer 212. As an example, controller 210 may receive an "A" button input, which may be translated by control input translation engine 214 as an acceleration input for the car racing videogame executed on mobile computing device 218, the acceleration input/command may be executed by mobile computing device 218, and video corresponding to that acceleration command modification in the game may be communicated to the display of personal computer 212 via display output translation engine 220, which may be the same translation engine as display output translation engine 203.

Figure 3:
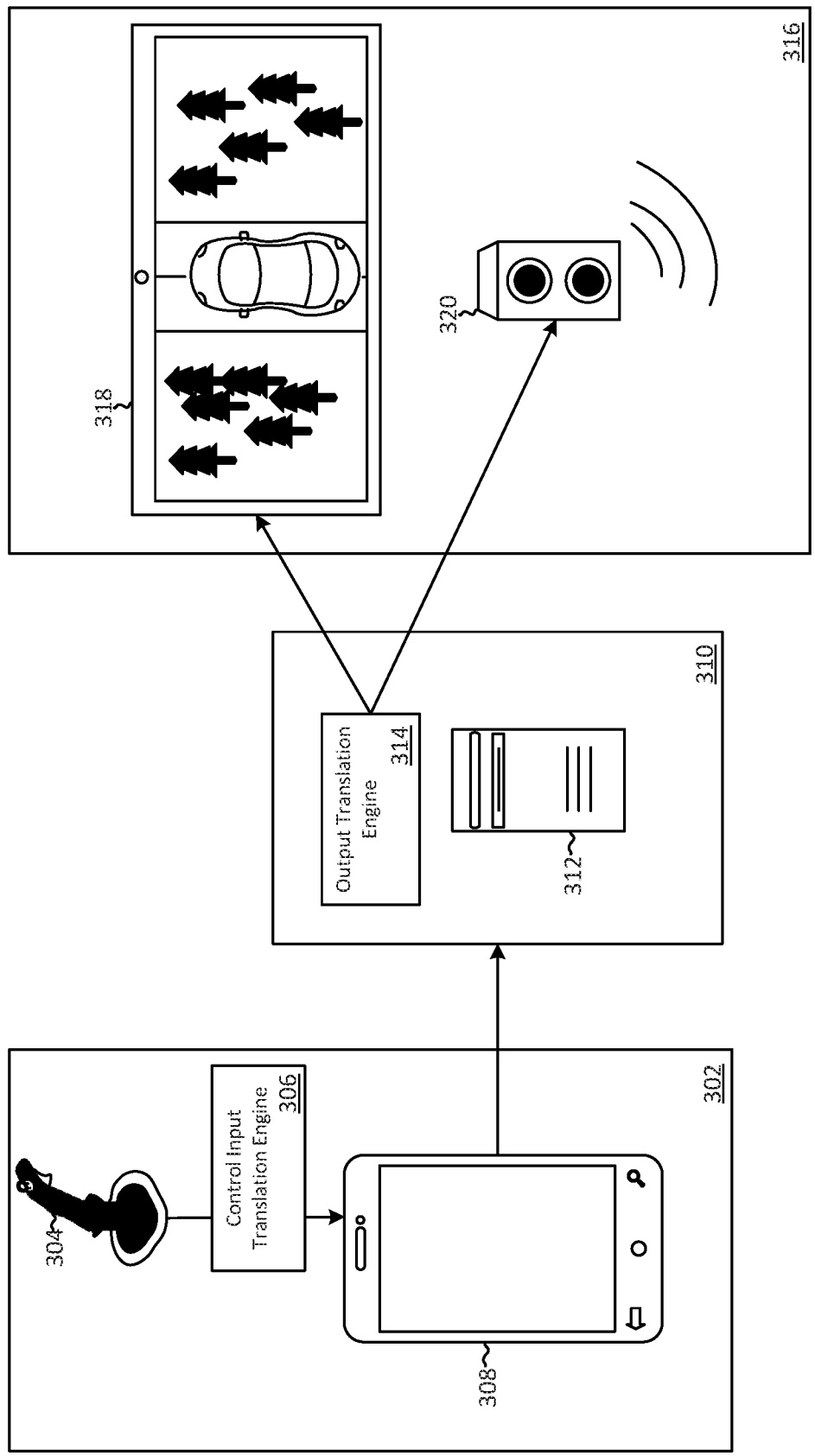
FIG. 3 illustrates another schematic diagram illustrating an example distributed computing environment for utilizing personal computer output resources and an associated controller input resource in the execution of a mobile videogame.

FIG. 3 illustrates another schematic diagram illustrating an example distributed computing environment 300 for utilizing personal computer output resources and an associated controller input resource in the execution of a mobile videogame. Distributed computing environment 300 includes input accessory sub-environment 304, primary computing device sub-environment 310, and accessory output sub-environment 316. Accessory sub-environment 304 includes mobile computing device 308, which is executing a car racing videogame, and joystick 304, which is associated with a primary computing device, and control input translation engine 306. Primary computing device sub-environment 310 includes personal computer 312 which is connected to joystick 304, and output translation engine 314. Accessory output sub-environment 316 includes external monitor 318 and speakers 320.

In this example, mobile computing device 308 and personal computer 312 have formed a connection (e.g., Bluetooth connection, Wi-Fi connection). A user associated with those devices has selected to play a car racing mobile videogame on mobile computing device 308 utilizing personal computer 312 and its associated input and output devices. The car racing mobile videogame thus begins to be executed by mobile computing device 308, which may receive input signals from input devices associated with personal computer 312 (e.g., joystick 304), and provide audio, video and/or haptic output via output devices associated with personal computer 312 (e.g., external monitor 318, speakers 320).

As illustrated in this example, joystick 304 (which is connected to personal computer 312) is compatible with the mobile car racing videogame. Thus, when a user utilizes one of the buttons and/or movement controls on joystick 304, that input is received by control input translation engine 306, which translates the input for interacting with the car racing videogame being executed on mobile computing device 308. Control input translation engine 306 may perform one or more operations to translate button and/or motion control input signals from joystick 304 for controlling or otherwise interacting with a videogame being executed on mobile computing device 308. According to examples, control input translation engine 306 may be associated with a translation list comprising an identity of a plurality of mobile videogames and an identity of a plurality of accessory devices that may be utilized to control and/or provide output for the corresponding videogames. In some examples, operations associated with the control input translation engine 306 may be performed on one or more of joystick 304, mobile computing device 308, personal computer 312, and/or external monitor 318. As an example, joystick 304 may receive a motion control input turn to the right, which may be translated by control input translation engine 306 as a "turn right" input for the car racing videogame executed on mobile computing device 308, the "turn right" input/command may be executed by mobile computing device 308 and/or a game engine associated with the mobile videogame executed on mobile computing device 308. In this example, the input from joystick 304 is shown as being directly sent from joystick 304 to mobile computing device 308 where the input/command can be executed. That is, joystick 304 may be connected (e.g., via Bluetooth) to mobile computing device 308 and the control input translation engine 306 may translate the input command on mobile computing device 308. In other examples, joystick 304 may send the input/command to personal computer 312, which may translate the input/command and send it to mobile computing device 308.

In this example, when mobile computing device 308 executes the "turn right" command from joystick 304, the resulting video and audio signal for the car racing videogame is sent from mobile computing device 308 to personal computer 312. Output translation engine 314, which may perform one or more output translation operations on personal computer 312, external monitor 318 and/or speakers 320 then translates the video and audio signals for the car racing videogame and translates them for surfacing on the corresponding audio and video devices associated with personal computer 312. Thus, in this example, the car in the car racing videogame may be caused to be turned to the right and that corresponding video may be displayed by external monitor 318, while tire sounds associated with that turning may be produced by speakers 320. In some examples the audio may be modified to accommodate additional audio channels that are supported by speakers 320.

Figure 4:
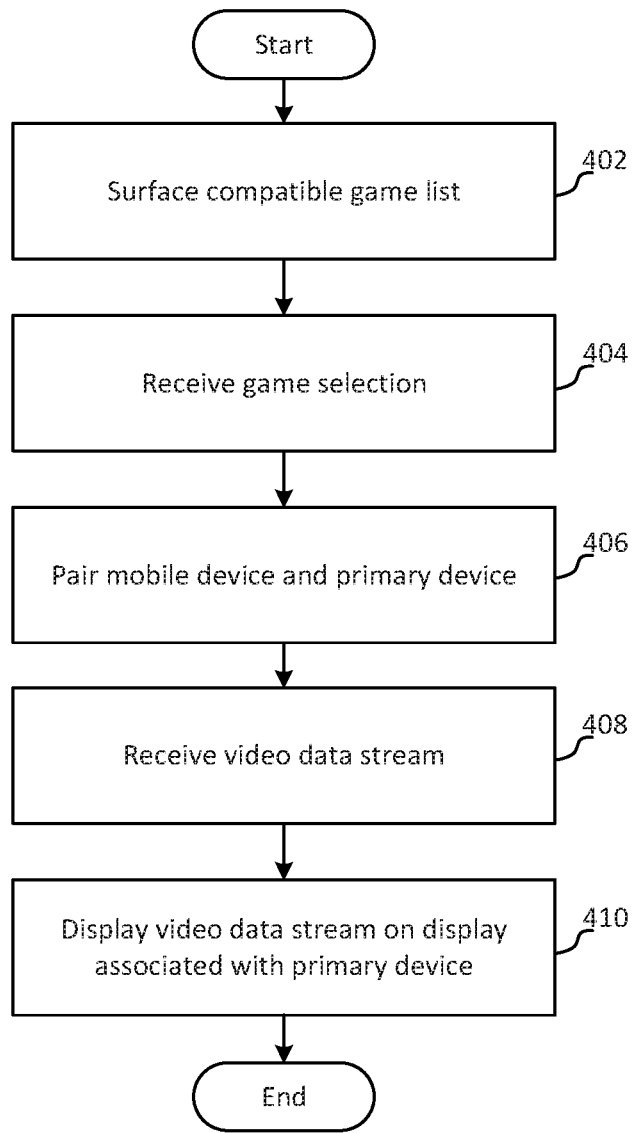
FIG. 4 is an exemplary method for providing collaborative use of computing resources in videogame execution.

FIG. 4 is an exemplary method 400 for providing collaborative use of computing resources in videogame execution. The method 400 begins at a start operation and flow moves to operation 402.

At operation 402 a list comprising an identity of a plurality of mobile games executable on a mobile computing device and controllable by one or more input devices for a primary computing device are surfaced. The list may be surfaced on the display of a primary computing device (e.g., a personal computer, a laptop computer, a videogame console). In examples, the list may be surfaced in response to a user opening a gaming application on the primary computing device. In other examples, the list may be surfaced in response to determining that a user's mobile computing device is within connectable proximity of the primary computing device and/or that the user is playing a mobile videogame within connectable proximity of the primary computing device.

From operation 402 flow continues to operation 404 where a selection of one of the plurality of mobile games is received. The user may use a touch gesture on the displayed list, a verbal command, and/or a mouse click to select one of the mobile games, for example.

From operation 404 flow continues to operation 406 where the mobile computing device and the primary computing device are paired. In some examples, the mobile computing device and the primary computing device may only be paired upon the selection of the mobile videogame. In other examples, the mobile computing device and the primary computing device may be paired prior to selection the mobile videogame (e.g., when the user opens the game application on the primary device, when the mobile computing device comes within connectable proximity of the primary device, etc.).

From operation 406 flow continues to operation 408 where a video data stream of the selected game being executed on the mobile computing device is received. In examples, the video data stream may be received by the primary computing device (e.g., the personal computer, the videogame console). The video data stream may be sent from the mobile computing device without the mobile computing device displaying the video stream for the videogame. In other examples, the mobile computing device may display the video on its display in addition to sending the video data stream to the primary computing device.

From operation 408 flow continues to operation 410 where the video data stream is displayed on a display device associated with the primary computing device. That is, the video data stream may be displayed on a display/monitor that is either connected to, or integrated in, the primary computing device. In some examples, the video data stream may be translated by a display output translation engine prior to its display on the primary computing device's display. The translation engine may modify the video data stream from a form compatible with the display size of the mobile computing device to a form compatible with a size of the primary computing device's display (e.g., provide a wider field of view for the primary game console display). In other examples, the translation engine may modify the framerate, resolution and/or pixel count for the videogame based on the specifications of the primary game console display compared to the mobile computing device.

From operation 410 flow moves to an end operation and the method 400 ends.

Figure 5:
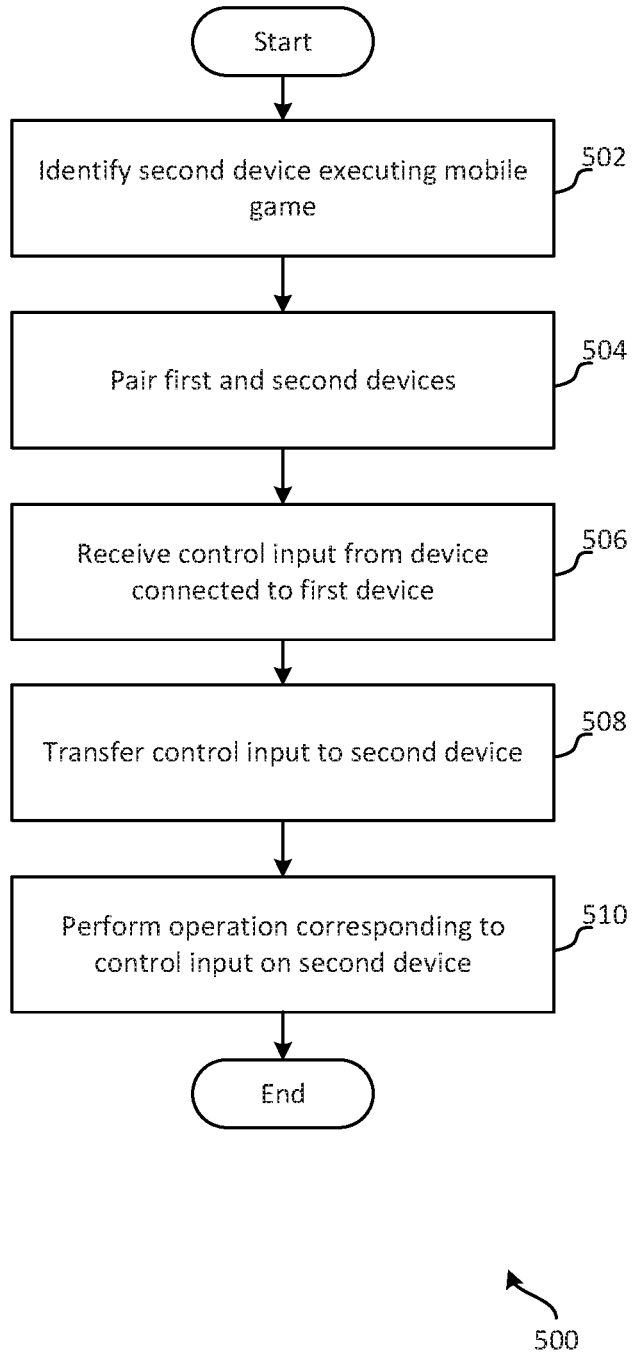
FIG. 5 is another exemplary method for providing collaborative use of computing resources in videogame execution.

FIG. 5 is another exemplary method 500 for providing collaborative use of computing resources in videogame execution. The method 500 begins at a start operation and flow moves to operation 502.

At operation 502 a first computing device identifies a second computing device executing a mobile game. In examples, the first computing device may comprise a primary computing device (e.g., a personal computer, a laptop, a videogame console), and the second computing device may comprise a mobile computing device (e.g., a smart phone, a tablet). In examples, a user may have started playing the mobile game on the second computing device while on the go, and arrived at home where the first computing device is located. The user may thus want to utilize resources/accessories of the first computing device now that they are available to the user.

From operation 502 flow continues to operation 504 where the first and second computing devices are paired. The pairing of the first and second computing devices may be accomplished via Bluetooth, Wi-Fi, Internet, or a wired connection, for example. The pairing may be accomplished automatically when the two devices are within pairing distance, or it may only occur when the user has manually selected to pair the devices.

From operation 504 flow continues to operation 506 where a control input from an input device connected to the first computing device is received. The control input may be from an accessory associated with the first computing device. For example, the first computing device may be connected to a joystick, videogame controller, keyboard and/or mouse, and the user may input a control to the first device via one of those accessories.

From operation 506 flow continues to operation 508 where the control input is transferred from the first computing device to the second computing device. In some examples, a translation engine may take the control input from the accessory that generated the input and translate that input for controlling one or more operations/actions associated with the mobile game being executed on the second computing device. The translation engine may be comprised in one or more of: the accessory that generated the input, the primary computing device (i.e., the first computing device), and/or the mobile computing device (i.e., the second computing device).

From operation 508 flow continues to operation 510 where an operation corresponding to the control input is performed in the mobile game on the second computing device. For example, if the accessory that generated the input was a steering wheel, and the input was a turn to the left, a car in the mobile game may be caused to turn left via execution of the control in the videogame by the second computing device. If, in a different example, the game is a flight simulator, and the input was a trigger pull on a joystick, the mobile game may be caused to fire via execution of the control in the videogame. Other examples should be apparent to those of skill in the art.

From operation 510 flow moves to an end operation and the method 500 ends.

Figure 6:
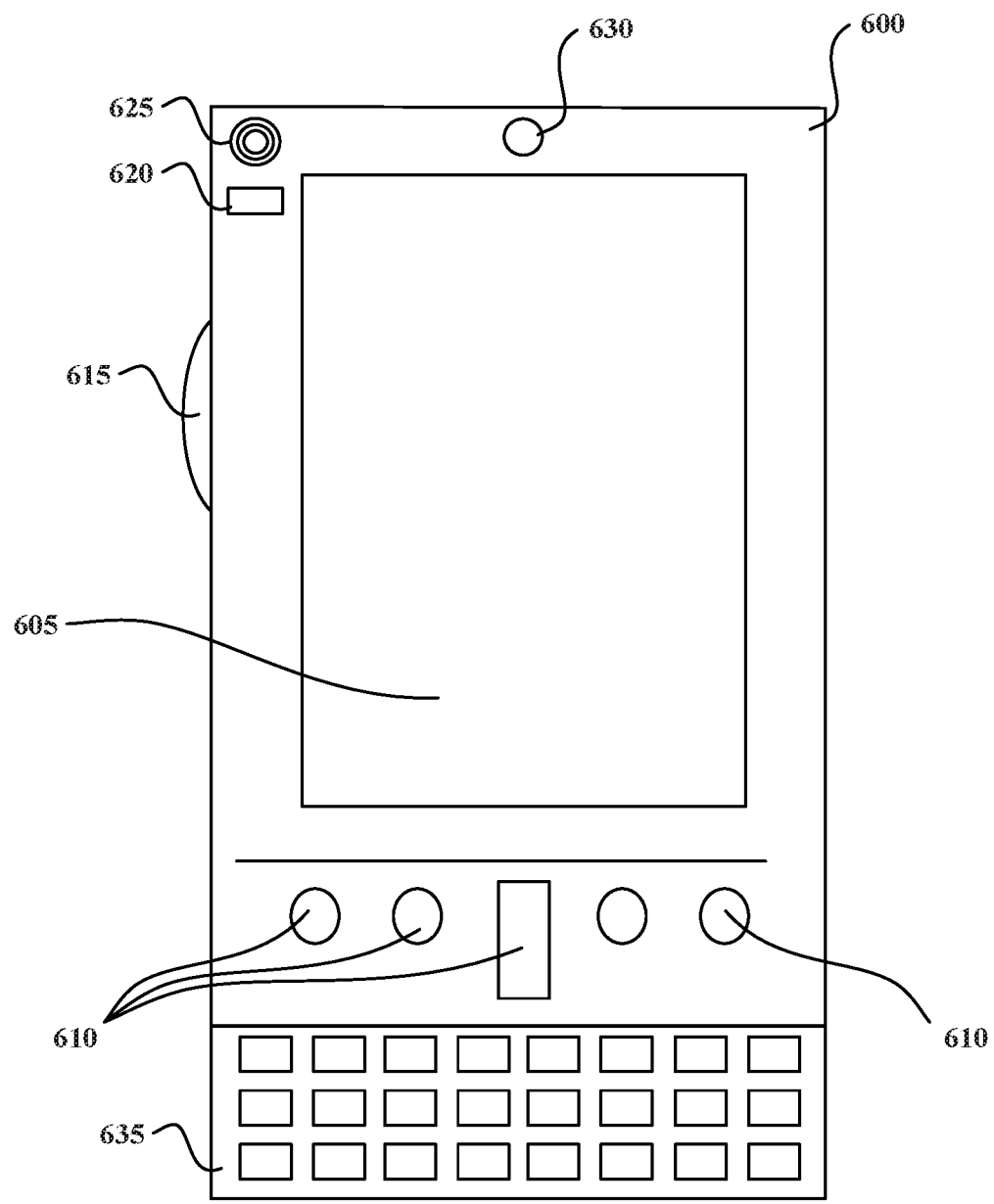
FIGS. 6 and 7 are simplified diagrams of a mobile computing device with which aspects of the disclosure may be practiced.
Figure 7:
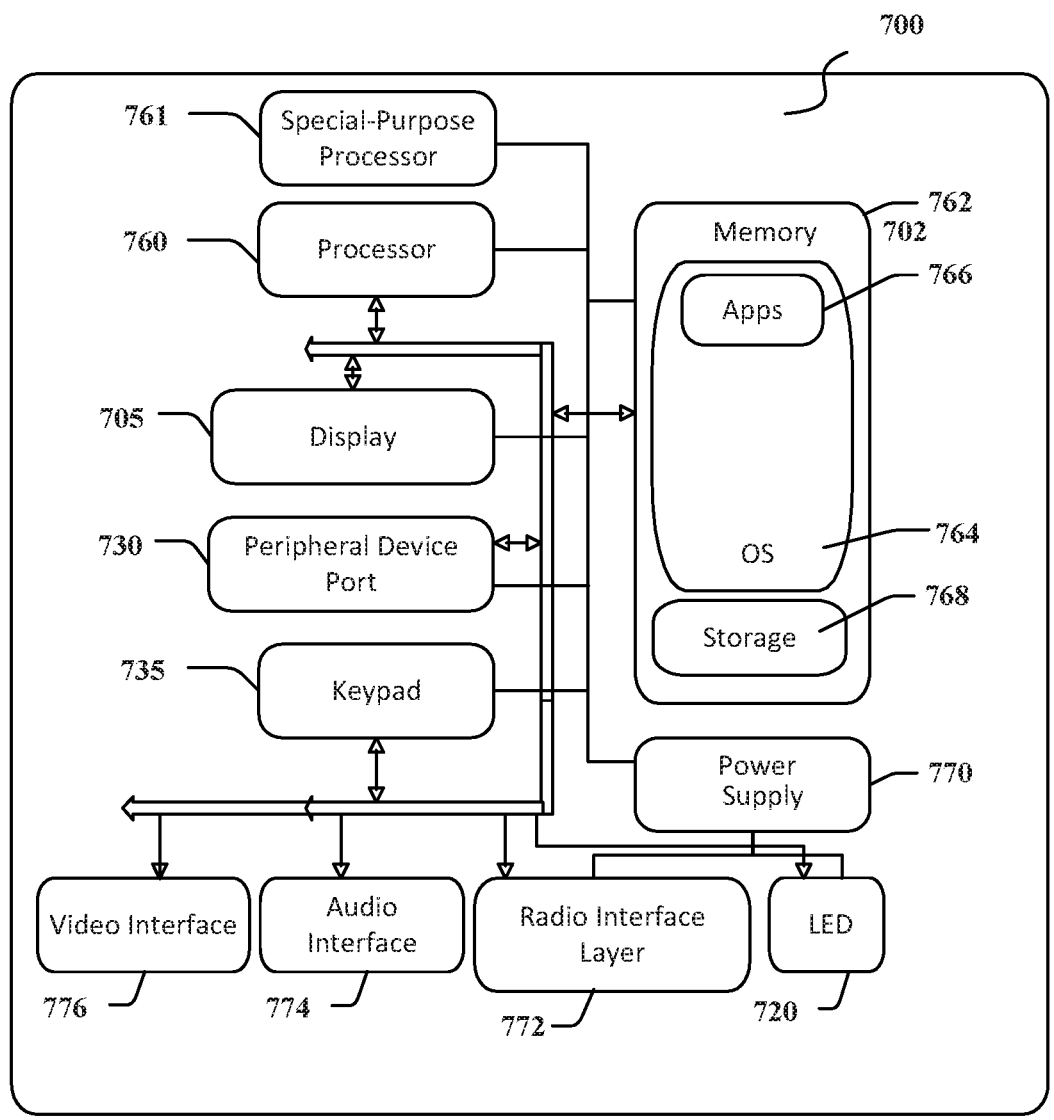

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a cross-device resources collaboration application.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
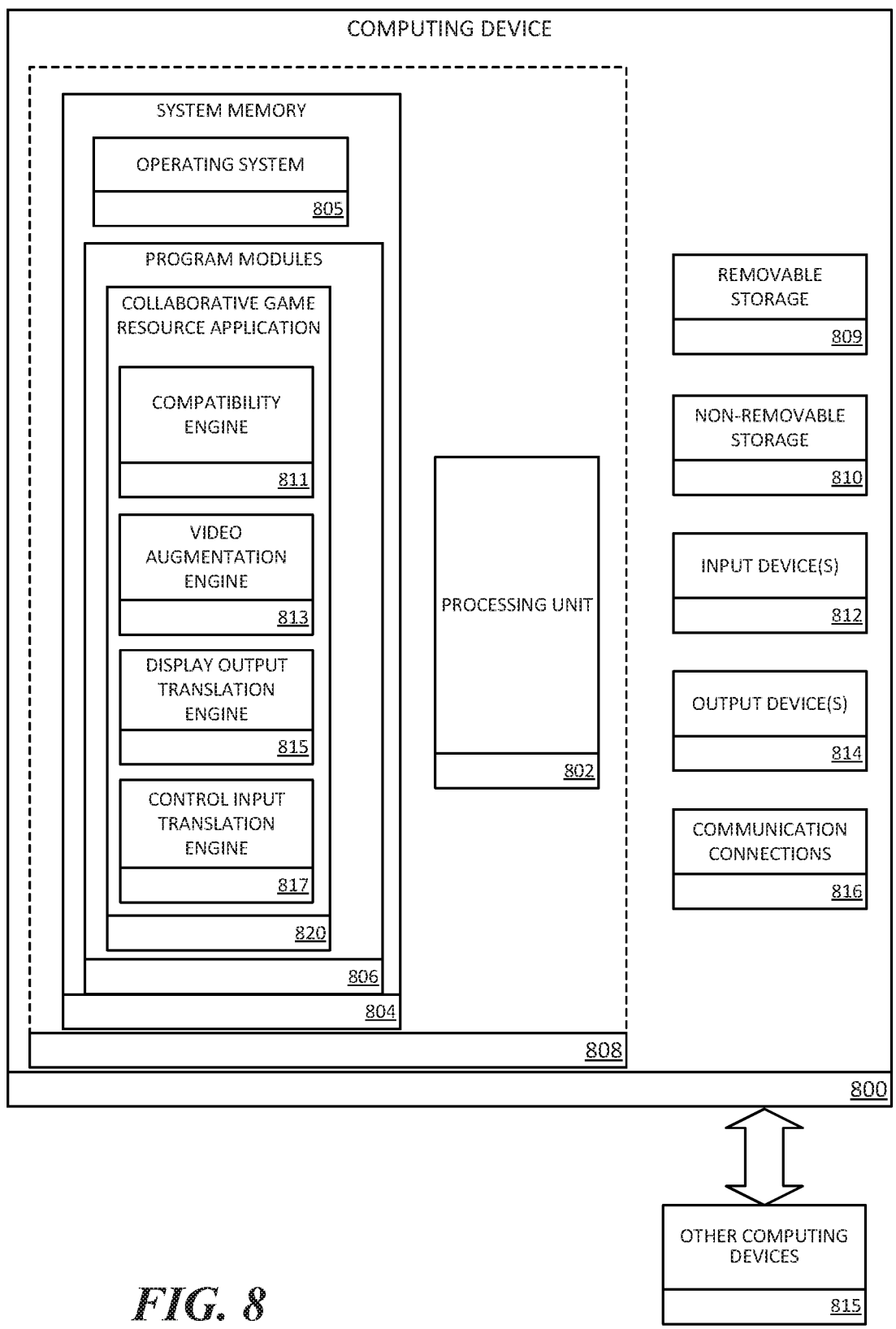
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with cross-device resource collaboration. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more cross-platform transformation programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., collaborative game resource application 820) may perform processes including, but not limited to, the aspects, as described herein. According to examples, compatibility engine 811 may perform one or more operations associated with determining whether mobile games are compatible with one or more input and/or output accessories of a primary gaming computing device. Video augmentation engine 813 and/or display output translation engine 815 may perform one or more operations associated with expanding the field of view, increasing the framerate and/or the pixel count for mobile games when transferring a video data stream from a mobile game to a primary gaming computing device. Control input translation engine 817 may perform one or more operations associated with translating inputs from primary gaming computing device accessories (e.g., mice, keyboards, joysticks, controllers, etc.) and converting those inputs to controls/inputs interpretable by mobile games executed on mobile computing devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
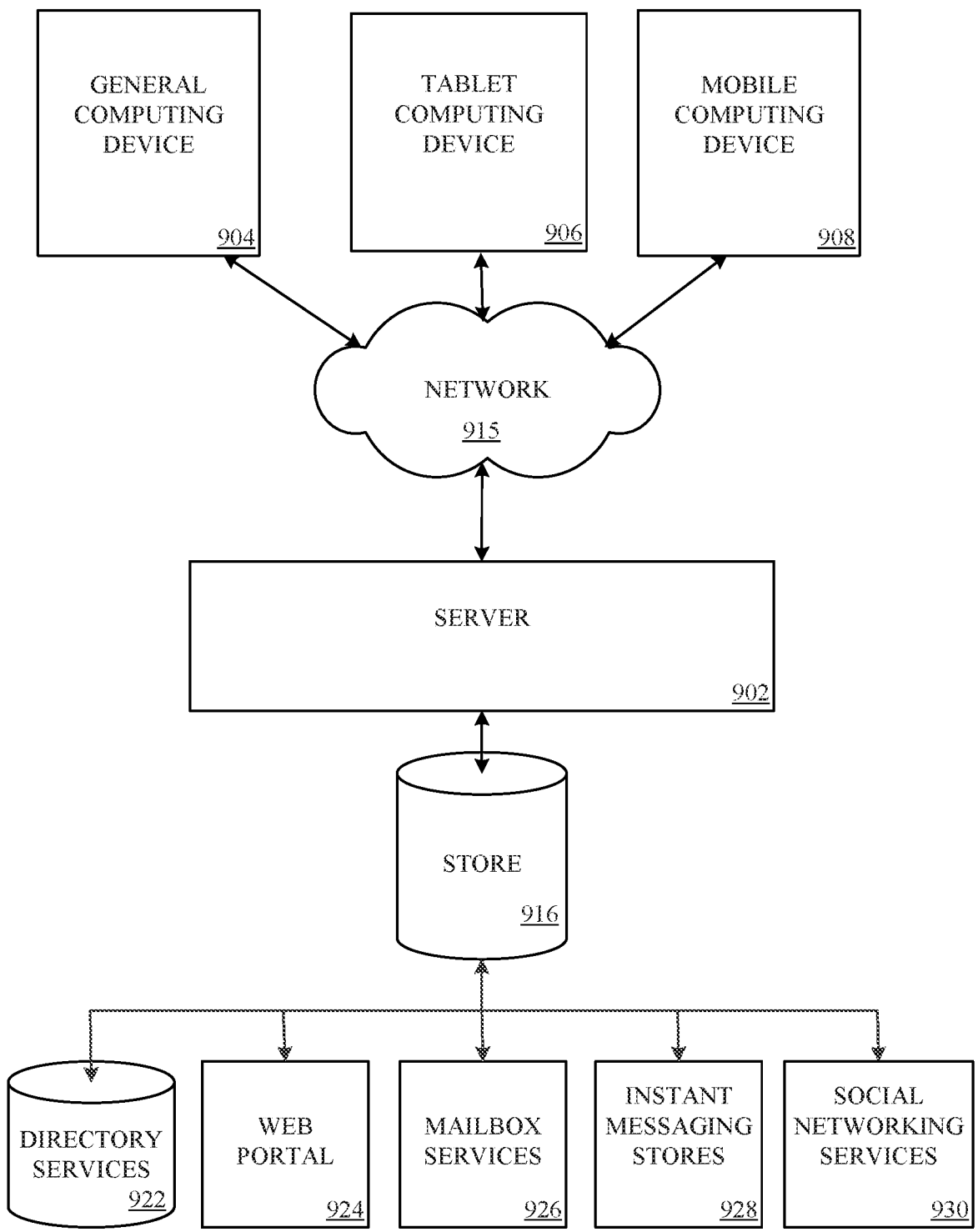
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for providing collaborative use of computing resources in videogame execution, comprising:
    a memory for storing executable program code; and
    one or more processors, functionally coupled to the memory, the one or more processors being responsive to computer-executable instructions contained in the program code and operative to:
        identify by a personal computer (PC) device, a mobile computing device, wherein the mobile computing device is executing a mobile game;
        pair the PC device and the mobile computing device;
        receive a control input, in a first format executable by the PC device, from an input device connected to the PC device;
        transfer the control input in the first format from the PC device to the mobile computing device;
        translate the control input from the first format to a second format that is executable by a game engine associated with the mobile game on the mobile computing device;
        execute, by the game engine on the mobile computing device, the translated control input; and
        perform an operation in the mobile game on the mobile computing device corresponding to the translated control input.

2. The system of claim 1, wherein the one or more processors are further responsive to the computer-executable instructions contained in the program code and operative to:
    receive an audio data stream of the mobile game from the mobile computing device; and
    audibly produce the audio data stream on at least one speaker device associated with the PC device.

3. The system of claim 1, wherein the control input is received from one of: a game controller input device; a steering wheel controller input device; a joystick input device; a mouse input device; and a keyboard input device.

4. The system of claim 1, wherein the one or more processors are further responsive to the computer-executable instructions contained in the program code and operative to:
    maintain, by the mobile computing device, a control input list comprising an identity of a plurality of input devices for the PC device that are compatible with the mobile computing device.

5. The system of claim 4, wherein the one or more processors are further responsive to the computer-executable instructions contained in the program code and operative to:
    maintain, by the mobile computing device, a set of instructions for controlling game applications for each of the plurality of input devices.

6. The system of claim 1, wherein the one or more processors are further responsive to the computer-executable instructions contained in the program code and operative to:
    identify a display device connected to the game console device;
    stream videogame data from the mobile game on the mobile computing device to the PC device; and
    cause the video data stream to be displayed on the display device.

7. The system of claim 1, wherein the one or more processors are further responsive to the computer-executable instructions contained in the program code and operative to:
    surface a list comprising an identity of a plurality of mobile games executable on the mobile computing device and controllable by one or more input devices connected to the PC device.

8. A method for providing collaborative use of computing resources in videogame execution, the method comprising:
    identifying, by a game console device, a mobile computing device, wherein the mobile computing device is executing a mobile game;
    pairing the game console device and the mobile computing device;
    receiving a control input, in a first format executable by the game console, from an input device connected to the game console device;
    transferring the control input in the first format from the game console device to the mobile computing device;
    translating the control input from the first format to a second format that is executable by a game engine associated with the mobile game on the mobile computing device;
    executing, by the game engine on the mobile computing device, the translated control input; and
    performing an operation in the mobile game on the mobile computing device corresponding to the translated control input.

9. The method of claim 8, further comprising maintaining a control input list comprising an identity of a plurality of input devices for computing devices that are compatible with the mobile computing device.

10. The method of claim 9, further comprising maintaining a set of instructions for controlling game applications for each of the plurality of input devices.

11. The method of claim 8, further comprising:
    identifying a display device associated with the game console device;
    streaming video game data from the mobile game on the mobile computing device to the display device; and
    causing the video data stream to be displayed on the display device.

12. The method of claim 8, further comprising:
    identifying a display device connected to the game console device;
    streaming video game data from the mobile game on the mobile computing device to the game console device; and
    causing the video data stream to be displayed on the display device.

13. The method of claim 8, further comprising:
    identifying a speaker device associated with the game console device;
    streaming audio game data from the mobile game on the mobile computing device to the speaker device; and
    causing the audio data stream to be audibly produced by the speaker device.

14. The method of claim 8, further comprising:
    identifying a speaker device connected to the game console device;
    streaming audio game data from the mobile game on the mobile computing device to the game console device; and
    causing the audio data stream to be audibly produced by the speaker device.

15. The method of claim 8, wherein the control input is generated by one of: a game controller input device; a steering wheel controller input device; a joystick input device; a mouse input device; and a keyboard input device.

16. A computer-readable storage device comprising executable instructions that, when executed by one or more processors, assists with providing collaborative use of computing resources in videogame execution, the computer-readable storage device including instructions executable by the one or more processors for:
- identifying, by a game console device, a mobile computing device, wherein the mobile computing device is executing a mobile game;
- pairing the game console device and the mobile computing device;
- receiving a control input, in a first format executable by the game console device, from an input device connected to the game console device;
- transferring the control input in the first format from the game console device to the mobile computing device;
- translating the control input from the first format to a second format that is executable by a game engine associated with the mobile game on the mobile computing device;
- executing, by the game engine on the mobile computing device, the translated control input; and
- performing an operation in the mobile game on the mobile computing device corresponding to the translated control input.

17. The computer-readable storage device of claim 16, wherein the instructions are further executable by the one or more processors for:
- identifying a display device associated with the game console device;
- streaming video game data from the mobile game on the mobile computing device to the display device; and
- causing the video data stream to be displayed on the display device.

18. The computer-readable storage device of claim 16, wherein the instructions are further executable by the one or more processors for:
- identifying a speaker device associated with the game console device;
- streaming audio game data from the mobile game on the mobile computing device to the speaker device; and
- causing the audio data stream to be audibly produced by the speaker device.

19. The computer-readable storage device of claim 16, wherein the control input is generated by one of: a game controller input device; a steering wheel controller input device; a joystick input device; a mouse input device; and a keyboard input device.

* * * * *